(12) United States Patent
Endo et al.

(10) Patent No.: US 7,063,818 B2
(45) Date of Patent: Jun. 20, 2006

(54) HC-ADSORBENT FOR INTERNAL COMBUSTION ENGINE

(75) Inventors: Tetsuo Endo, Wako (JP); Haruhiko Shimizu, Wako (JP); Go Motohashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 617 days.

(21) Appl. No.: 10/013,951

(22) Filed: Dec. 13, 2001

(65) Prior Publication Data

US 2002/0132726 A1  Sep. 19, 2002

(30) Foreign Application Priority Data

Dec. 15, 2000 (JP) .............................. 2000-382264

(51) Int. Cl.
*B01D 53/34* (2006.01)
*B01J 29/04* (2006.01)

(52) U.S. Cl. .................. 422/177; 422/171; 502/60; 502/64; 502/67

(58) Field of Classification Search .............. 60/274, 60/277, 297; 423/212, 213.2; 502/68, 71, 502/80, 60, 64, 67; 422/171, 177
See application file for complete search history.

(56) References Cited

U.S. PATENT DOCUMENTS 5,417,947 A * 5/1995 Hertl et al. .................. 423/212
5,958,818 A * 9/1999 Demmel et al. .............. 502/68
6,354,076 B1 * 3/2002 Yasui et al. ................... 60/274

FOREIGN PATENT DOCUMENTS

JP      2000087733 A  *  3/2000

* cited by examiner

*Primary Examiner*—Hien Tran
*Assistant Examiner*—Tom P. Duong
(74) *Attorney, Agent, or Firm*—Arent Fox PLLC

(57) ABSTRACT

An internal combustion engine HC-adsorbent is located in one of a pair of exhaust passages in parallel to each other downstream of an emission control catalyst for purifying an exhaust gas and through which exhaust gas flows selectively by a switchover valve. The adsorbent is a zeolite mixture having pores at least 3.5 Å and smaller than 6 Å and not equal or larger than 6 Å and smaller than 7 Å, and zeolite having pores at least 7 Å and smaller than 10 Å and not equal or larger than 6 Å and smaller than 7 Å. HCs are desorbed quickly and easily lowering the desorption temperature, while ensuring excellent adsorbing performance for HCs of different molecular diameters. Even when a vehicle travels only a short duration after engine starting, desorption advances quickly and reliably, the adsorbent exhibiting intended adsorbing performance at the next engine starting.

6 Claims, 12 Drawing Sheets

PROPORTIONS OF HYDROCARBONS CONTAINED IN EXHAUST GAS AND HAVING VARIOUS NUMBERS OF CARBON ATOMS (EXCLUDING HYDROCARBON HAVING ONE CARBON ATOM)

| | FEFRRIERITE | MFI-TYPE METALLO-SILICATE | MORDENITE | β | USY |
|---|---|---|---|---|---|
| C2H6 | 123 | — | — | — | — |
| C3H6 | 126 | 141 | — | 121 | — |
| C4H10 | — | 202 | 163 | 168 | — |
| C5H10 | — | 215 | 202 | 194 | 159 |
| C6H6 | — | 237 | 224 | 247 | 229 |
| C7H8 | — | 239 | 260 | 262 | 263 |
| C8H10 | — | 167 | 279 | 310 | 281 |
| C8H18 | — | — | 332 | 289 | 279 |

FIG. 6  MEASUREMENT OF DESORPTION RATE

Legend:
- ○ FERRIERITE
- ● MFI-TYPE METALLOSILICATE
- △ MORDENITE
- ▲ β
- ■ USY
- ◆ TERNARY MIXTURE

| TEMPERATURE (°C) | FERRIERITE | MFI-TYPE METALLOSILICATE | USY | MORDENITE | β | TERNARY MIXTURE |
|---|---|---|---|---|---|---|
| 60 | 2.7 | 0.0 | 0.0 | 0.0 | 0.0 | 0.0 |
| 70 | 13.5 | 0.0 | 0.0 | 0.0 | 0.0 | 0.0 |
| 80 | 34.0 | 0.0 | 0.0 | 0.0 | 0.0 | 0.3 |
| 90 | 61.6 | 0.0 | 0.0 | 0.0 | 0.0 | 4.6 |
| 100 | 85.1 | 0.5 | 0.0 | 0.0 | 0.0 | 17.3 |
| 110 | 97.1 | 5.9 | 0.0 | 0.0 | 0.0 | 39.8 |
| 120 | 100.0 | 16.4 | 0.0 | 0.0 | 0.0 | 61.3 |
| 130 | 100.0 | 35.4 | 0.1 | 0.0 | 0.0 | 77.5 |
| 140 | 100.0 | 51.9 | 4.9 | 1.2 | 0.0 | 87.9 |
| 150 | 100.0 | 67.6 | 23.8 | 6.3 | 0.0 | 93.8 |
| 160 | 100.0 | 80.2 | 42.9 | 15.6 | 2.8 | 96.4 |
| 170 | 100.0 | 85.4 | 63.0 | 32.3 | 13.9 | 97.8 |
| 180 | 100.0 | 89.6 | 76.5 | 48.8 | 33.7 | 98.7 |
| 190 | 100.0 | 93.4 | 83.2 | 66.3 | 54.3 | 99.3 |
| 200 | 100.0 | 96.3 | 89.1 | 78.8 | 72.1 | 99.9 |
| 210 | 100.0 | 97.8 | 93.5 | 86.6 | 80.7 | 100.0 |
| 220 | 100.0 | 99.0 | 96.2 | 92.1 | 87.4 | 100.0 |
| 230 | 100.0 | 99.7 | 97.6 | 95.9 | 90.6 | 100.0 |
| 240 | 100.0 | 100.0 | 98.7 | 97.6 | 92.5 | 100.0 |
| 250 | 100.0 | 100.0 | 99.3 | 99.0 | 94.1 | 100.0 |
| 260 | 100.0 | 100.0 | 99.6 | 99.4 | 96.0 | 100.0 |
| 270 | 100.0 | 100.0 | 99.8 | 99.6 | 96.8 | 100.0 |
| 280 | 100.0 | 100.0 | 100.0 | 99.7 | 97.5 | 100.0 |
| 290 | 100.0 | 100.0 | 100.0 | 99.8 | 98.0 | 100.0 |
| 300 | 100.0 | 100.0 | 100.0 | 99.9 | 98.6 | 100.0 |
| 310 | 100.0 | 100.0 | 100.0 | 100.0 | 99.0 | 100.0 |
| 320 | 100.0 | 100.0 | 100.0 | 100.0 | 99.3 | 100.0 |
| 330 | 100.0 | 100.0 | 100.0 | 100.0 | 99.6 | 100.0 |
| 340 | 100.0 | 100.0 | 100.0 | 100.0 | 99.8 | 100.0 |
| 350 | 100.0 | 100.0 | 100.0 | 100.0 | 100.0 | 100.0 |

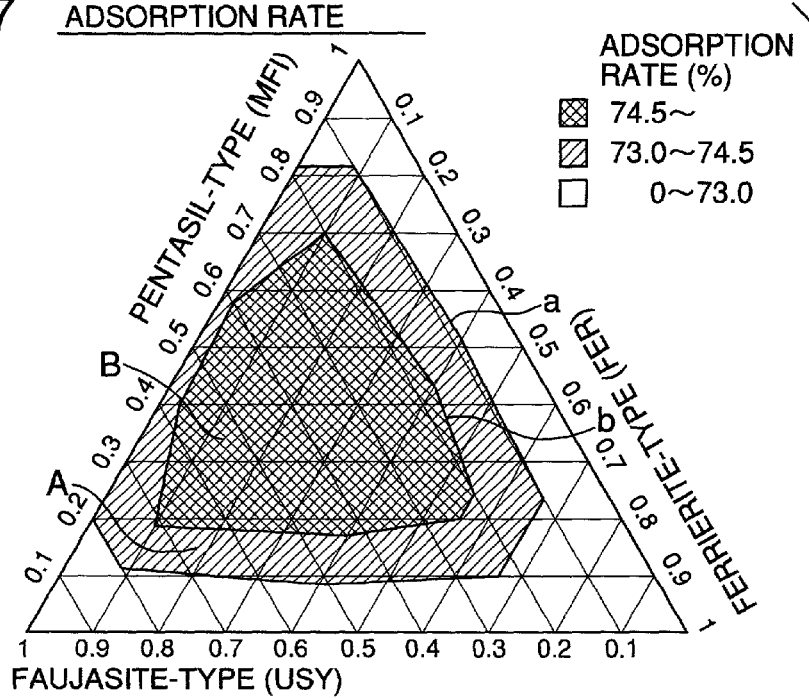
FIG. 7 RATIO OF ZEOLITES AND ADSORPTION RATE
ADSORPTION RATE (%)
- ▩ 74.5~
- ▨ 73.0~74.5
- ☐ 0~73.0
| FER | MFI | USY | ADSORPTION RATE (%) | FER | MFI | USY | ADSORPTION RATE (%) | FER | MFI | USY | ADSORPTION RATE (%) |
|---|---|---|---|---|---|---|---|---|---|---|---|
| 0 | 0 | 1 | 59.9 | 0.2 | 0.1 | 0.7 | 73.0 | 0.4 | 0.6 | 0 | 46.6 |
| 0 | 0.1 | 0.9 | 70.9 | 0.2 | 0.2 | 0.6 | 75.1 | 0.5 | 0 | 0.5 | 56.2 |
| 0 | 0.2 | 0.8 | 73.1 | 0.2 | 0.3 | 0.5 | 75.2 | 0.5 | 0.1 | 0.4 | 73.1 |
| 0 | 0.3 | 0.7 | 73.6 | 0.2 | 0.4 | 0.4 | 75.4 | 0.5 | 0.2 | 0.3 | 74.7 |
| 0 | 0.4 | 0.6 | 74.1 | 0.2 | 0.5 | 0.3 | 75.2 | 0.5 | 0.3 | 0.2 | 74.7 |
| 0 | 0.5 | 0.5 | 74.3 | 0.2 | 0.6 | 0.2 | 74.8 | 0.5 | 0.4 | 0.1 | 73.2 |
| 0 | 0.6 | 0.4 | 74.3 | 0.2 | 0.7 | 0.1 | 73.1 | 0.5 | 0.5 | 0 | 43.9 |
| 0 | 0.7 | 0.3 | 74.0 | 0.2 | 0.8 | 0 | 51.9 | 0.6 | 0 | 0.4 | 54.8 |
| 0 | 0.8 | 0.2 | 73.8 | 0.3 | 0 | 0.7 | 58.6 | 0.6 | 0.1 | 0.3 | 73.1 |
| 0 | 0.9 | 0.1 | 71.8 | 0.3 | 0.1 | 0.6 | 73.1 | 0.6 | 0.2 | 0.2 | 74.3 |
| 0 | 1 | 0 | 56.6 | 0.3 | 0.2 | 0.5 | 75.0 | 0.6 | 0.3 | 0.1 | 73.0 |
| 0.1 | 0 | 0.9 | 60.5 | 0.3 | 0.3 | 0.4 | 75.2 | 0.6 | 0.4 | 0 | 41.0 |
| 0.1 | 0.1 | 0.8 | 72.6 | 0.3 | 0.4 | 0.3 | 75.1 | 0.7 | 0 | 0.3 | 53.2 |
| 0.1 | 0.2 | 0.7 | 74.6 | 0.3 | 0.5 | 0.2 | 74.9 | 0.7 | 0.1 | 0.2 | 72.3 |
| 0.1 | 0.3 | 0.6 | 75.0 | 0.3 | 0.6 | 0.1 | 73.2 | 0.7 | 0.2 | 0.1 | 72.3 |
| 0.1 | 0.4 | 0.5 | 75.2 | 0.3 | 0.7 | 0 | 49.2 | 0.7 | 0.3 | 0 | 37.9 |
| 0.1 | 0.5 | 0.4 | 75.2 | 0.4 | 0 | 0.6 | 57.6 | 0.8 | 0 | 0.2 | 51.5 |
| 0.1 | 0.6 | 0.3 | 74.8 | 0.4 | 0.1 | 0.5 | 73.2 | 0.8 | 0.1 | 0.1 | 70.2 |
| 0.1 | 0.7 | 0.2 | 74.5 | 0.4 | 0.2 | 0.4 | 75.1 | 0.8 | 0.2 | 0 | 34.8 |
| 0.1 | 0.8 | 0.1 | 73.0 | 0.4 | 0.3 | 0.3 | 75.0 | 0.9 | 0 | 0.1 | 48.2 |
| 0.1 | 0.9 | 0 | 54.2 | 0.4 | 0.4 | 0.2 | 74.9 | 0.9 | 0.1 | 0 | 71.4 |
| 0.2 | 0 | 0.8 | 59.7 | 0.4 | 0.5 | 0.1 | 73.0 | 1 | 0 | 0 | 3.9 |

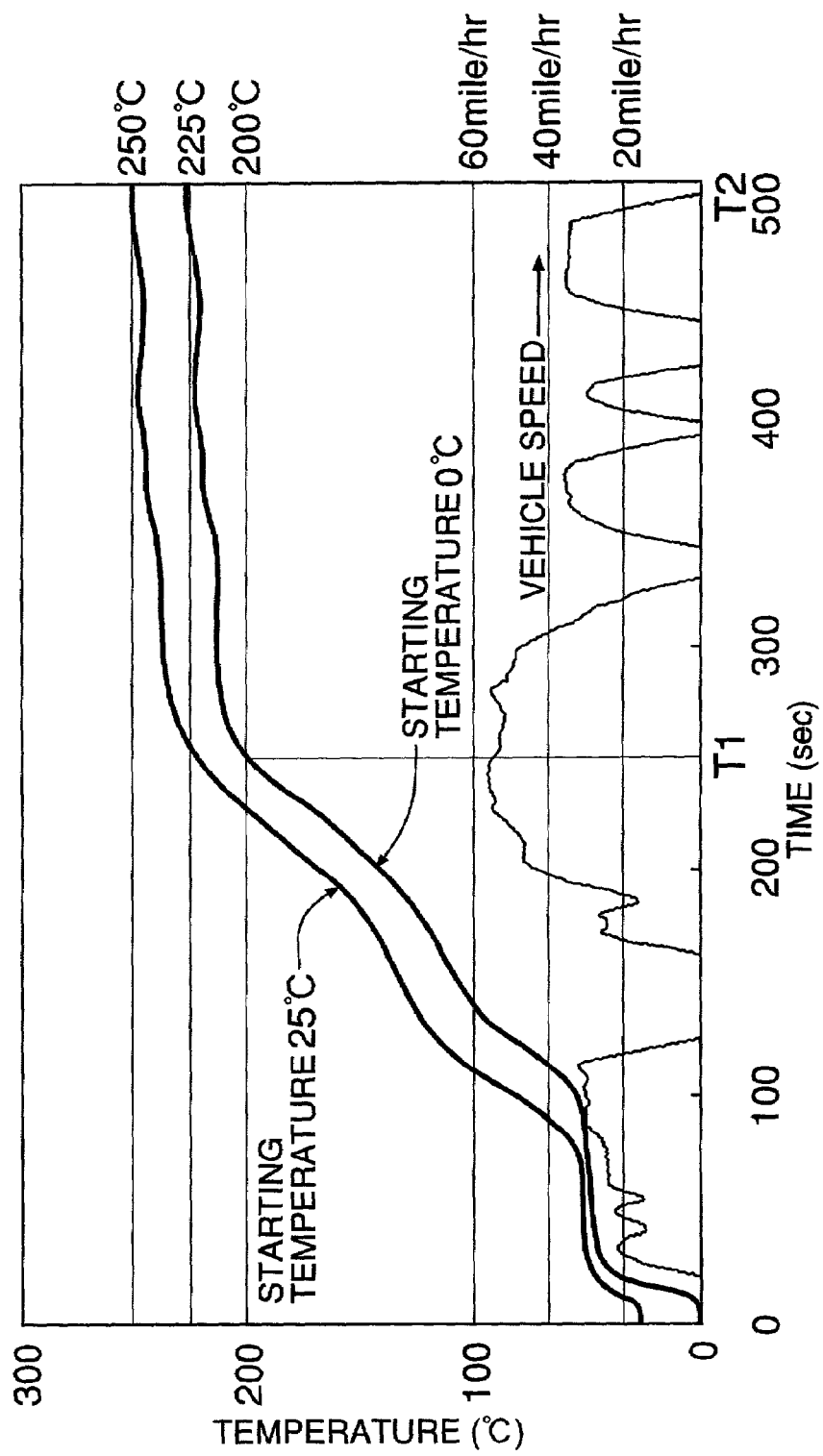

HC-ADSORBENT FOR INTERNAL COMBUSTION ENGINE

BACKGROUND OF THE INVENTION

1. Field of the Invention

The present invention relates to an HC adsorbent for an internal combustion engine, and particularly to an HC adsorbent mounted in one of a pair of exhaust passages which are provided in parallel to each other in an exhaust pipe downstream of an exhaust emission control catalyst, and through which an exhaust gas is selectively permitted to flow by a switchover valve.

2. Description of the Related Art

A conventional HC adsorbent suffers from the following problem: At the cold start of an internal combustion engine, an exhaust emission control catalyst in an exhaust system does not yet rise to an activating temperature, notwithstanding that an unburned hydrocarbon (which will be referred simply to as HC herein) is contained in a large amount in an exhaust gas. For this reason, the unburned HC cannot be oxidized and converted effectively by the catalyst.

To solve this problem, it has been already proposed (for example, see Japanese Patent Application Laid-open No.10-153, 112) to use the above-described HC adsorbent in combination with an exhaust emission control catalyst. More specifically, in the proposed system, the releasing of the unburned HC to the atmosphere is inhibited by shifting the switchover valve to a starting position in an inactivated state of the catalyst at the start of the engine to permit the exhaust gas to flow through the adsorbent, thereby adsorbing an unburned HC in an exhaust gas to the adsorbent. After activation of the catalyst, the switchover valve is shifted to a usual position to permit the exhaust gas to flow, bypassing the adsorbent, and the adsorbed HC is desorbed from the adsorbent. The desorbed HC is recirculated to a location upstream of the catalyst or the intake system in the internal combustion engine, whereby it is converted or reburned. In this manner, the emission in the exhaust gas can be reduced.

It has been also proposed to use a zeolite as an HC adsorbent such as an aluminosilicate, metallosilicate and the like in the conventional system with the heat resistance taken into consideration.

The number of types of hydrocarbons (HCs) contained in the exhaust gas is 200 or more, and the shapes and sizes of the HCs are various. Therefore, various types of zeolites having pores of different pore sizes such as aluminosilicate and metallosilicate zeolites, e.g., chabazite-type, ferrierite-type, pentasil-type, mordenite-type, faujasite-type, beta-type zeolites are combined in various ratios for use as an adsorbent, so that the adsorption performance for HCs having various molecular diameters is satisfied.

However, such technique suffers from a problem that the adsorption performance is enhanced for various HC, but a temperature at which the desorption of HCs from the adsorbent is completed (which will be referred simply to as a desorption temperature hereinafter) is increased.

In a structure designed so that only when a catalyst is inactivated, a switchover valve permits an exhaust gas (its temperature at this time is relatively low) to flow through an adsorbent, and after activation of the catalyst, the switchover valve permits the exhaust gas to flow through a bypass passage without flowing through the adsorbent, as in the above proposed system, the temperature of the adsorbent itself is difficult to rise and for this reason, an attempt is made to raise the temperature of the adsorbent by placing the adsorbent in the proximity to the exhaust gas bypass passage or by another means. In this case, however, there is a problem that the type of HC requiring a high temperature for desorption thereof cannot be desorbed quickly.

If the adsorbed HC is not desorbed quickly, as described above, there is a possibility that the undesorbed HC remains not a little, when the vehicle is moved to travel for only an extremely short time after the starting of the engine. In such a case, there is a possibility that the adsorbing performance of the adsorbent is reduced due to the undesorbed HC still remaining in the adsorbent at the next starting of the engine, whereby the exhaust gas purifying performance is detracted.

SUMMARY OF THE INVENTION

Accordingly, it is an object of the present invention to provide a an HC adsorbent for an internal combustion engine, wherein it has a good adsorbing performance for various HCs of different molecular diameters and moreover, even when the vehicle is moved to travel for only an extremely short time after the starting of the engine, the desorption of the adsorbed HCs advances quickly and reliably, and an intended adsorbing performance can be exhibited sufficiently at the next starting of the engine, whereby the above problems are solved.

To achieve the above object, according to a first aspect and feature of the present invention, there is provided an HC adsorbent for an internal combustion engine, which is mounted in one of a pair of exhaust passages which are provided in parallel to each other in an exhaust pipe downstream of an exhaust emission control catalyst for purifying an exhaust gas of the internal combustion engine, and through which the exhaust gas is permitted to flow selectively by a switchover valve, wherein the adsorbent is formed of a mixture of a zeolite having pores of a small diameter equal to or larger than 3.5 Å and smaller than 6 Å and no pore of a small diameter equal to or larger than 6 Å and smaller than 7 Å, and a zeolite having pores of a small diameter equal to or larger than 7 Å and smaller than 10 Å and no pore of a small diameter equal to or larger than 6 Å and smaller than 7 Å.

The word "small diameter" as used in the present invention means a smallest inner diameter of those of an infinite number of pores in the zeolite, which have one or two or more particular sizes due to the crystalline structure of the zeolite. In other words, the zeolite has an infinite number of pores having one or two or more particular sizes due to the crystalline structure of the zeolite, and the smallest inner diameter of the pores having particular sizes is the "small diameter". Therefore, in the case of a zeolite having two or more pore sizes, a small diameter is defined in each of the sizes. For example, in the case of a ferrierite-type zeolite, it has pores having two particular sizes (3.5×4.8 Å and 4.2×5.4 Å), and the small diameters in the sizes are 3.5 Å and 4.2 Å, respectively.

The types of the adsorption provided by the zeolite are a physical adsorption and a chemical adsorption. Particularly, the physical adsorption is caused dominantly by an intermolecular attraction. Therefore, if the small diameter of pores in the zeolite is a value substantially corresponding to the molecular diameter of HC, the intermolecular attraction acts intensively and as a result, the desorption temperature is higher as the adsorbing force is higher. On the other hand, HCs contained in the exhaust gas are of various types, as shown in FIGS. 3 and 4 and have carbon atoms in a range of 1 to 11 (which will be represented simply by C1 to C11 hereinafter). The larger the molecular weight of the HC is, the larger the molecular diameter of the HC is. The desorption temperature tends to be high in molecules having a large molecular diameter such as iso-molecules such as those of 2,2,4-trimethyl pentane; and aromatic molecules such as those of toluene and xylene, both of which are contained in exhaust gas in a large amount.

As a result of the examination of the molecular diameter of such hydrocarbons (HCs) requiring the high desorption temperature such as 2,2,4-trimethyl pentane, toluene, xylene and the like, it has been made clear that the small diameter of the molecules is approximately in a range of 6 Å to 7 Å, and a zeolite having pores of a small diameter in such range requires a high desorption temperature. In addition, the following has been confirmed by an experiment: With a zeolite having pores of a small diameter equal to or smaller than 6 Å and no pore of a small diameter equal to or larger than 6 Å and smaller than 7 Å, the HCs requiring the high desorption temperature little enter into the pores in the zeolite. On the other hand, with a zeolite having pores of a small diameter equal to or larger than 7 Å and no pore of a small diameter equal to or larger than 6 Å and smaller than 7 Å, even if it adsorbs the HCs, the adsorbed HCs are relatively easily desorbed at a lower desorption temperature, causing no problem. Further, it has been confirmed by an experiment that with a zeolite having pores of a small diameter equal to or smaller than 3.5 Å, most of HCs contained in the exhaust gas do not enter into the pores in the zeolite, and with a zeolite having pores of a small diameter equal to or larger than 10 Å, the HCs enter into the pores in the zeolite, but are little adsorbed and retained in the zeolite.

Thus, the HCs having a large molecular diameter such as C8 to C11 little enter into the pores of 6 Å or less in the zeolite and hence, to adsorb these HCs, zeolites having pores of a small diameter equal to or larger than 6 Å are required. Among such zeolites, particularly, the zeolite having pores of a small diameter equal to or larger than 6 Å and smaller than 7 Å requires an increased desorption temperature for the above-described reason. Thus, the zeolite having pores of a small diameter equal to or larger than 7 Å and smaller than 10 Å and no pore of a small diameter equal to or larger than 6 Å and smaller than 7 Å is suitable for adsorption of such HCs. The zeolite having pores of a small diameter equal to or larger than 3.5 Å and smaller than 6 Å and no pore of a small diameter equal to or larger than 6 Å and smaller than 7 Å is suitable for adsorption of HCs having other molecular diameters. Therefore, if an HC adsorbent is formed of the zeolite having pores of a small diameter equal to or larger than 3.5 Å and smaller than 6 Å and no pore of a small diameter equal to or larger than 6 Å and smaller than 7 Å and the zeolite having pores of a small diameter equal to or larger than 7 Å and smaller than 10 Å and no pore of a small diameter equal to or larger than 6 Å and smaller than 7 Å as in the first feature of the present invention, a high-performance HC adsorbent is provided, which is excellent in adsorbing performance for various HCs of different molecular diameters and moreover, from which the adsorbed HCs can be quickly at a relatively low temperature.

Thus, with an HC adsorbent through which an exhaust gas flows only for a period until the exhaust emission control catalyst is activated, the adsorbed HCs can be desorbed quickly and easily and the desorption temperature can be lowered to the utmost, while maintaining the excellent adsorbing performance for the various HCs of the different molecular diameters. Therefore, even when the vehicle is moved to travel only for a short time after starting of the engine, the desorption of HCs adsorbed by the adsorbent advances quickly and reliably, and at the next start of the engine, the adsorbent can exhibit an intended adsorbing performance sufficiently.

According to a second aspect and feature of the present invention, there is provided an HC adsorbent for an internal combustion engine, which is mounted in one of a pair of exhaust passages which are provided in parallel to each other in an exhaust pipe downstream of an exhaust emission control catalyst for purifying an exhaust gas of the internal combustion engine, and through which the exhaust gas is permitted to flow selectively by a switchover valve, wherein the adsorbent is formed of a mixture of a plurality of types of zeolites having pores of different small diameters, a zeolite having pores of a small diameter equal to or larger than 3.5 Å and smaller than 6 Å and no pore of a small diameter equal to or larger than 6 Å and smaller than 7 Å and a zeolite having pores of a small diameter equal to or larger than 7 Å and smaller than 10 Å and no pore of a small diameter equal to or larger than 6 Å and smaller than 7 Å being contained in a total amount equal to or higher than 80% by weight in the mixture, and a zeolite having pores of a small diameter equal to or larger than 6 Å and smaller than 7 Å being also contained in an amount not exceeding 20% by weight in the mixture.

The zeolite having pores of a small diameter equal to or larger than 6 Å and smaller than 7 Å as described above has a characteristic that it has an adsorbing ability for HC having a larger molecular weight and a molecular diameter in a range of approximately 6 Å to 7 Å, but the desorption of the adsorbed HC is difficult to occur (i.e., a relatively long time is required for the desorption of the adsorbed HC). However, the amount of such zeolite added to the adsorbent is suppressed to smaller than 20% by weight in the second feature of the present invention and hence, the increase in desorption temperature caused by such addition of the zeolite can be suppressed to a level causing no problem, i.e., the desorption temperature can be suppressed to 250° C. or lower (the desorption rate is 90% or higher at 200° C.). In this case, a reduction in adsorption rate at the next time, i.e., at the next start of the engine is 2% or lower, which almost causes no problem. Therefore, with the second feature of the present invention, for the same reason as in the first feature, a high-performance adsorbent is provided, which is excellent in adsorbing performance for various HCs of different molecular diameters and moreover, from which the adsorbed HCs can be desorbed quickly at a relatively low temperature.

In an exhaust emission control system of a so-called in-line type which has no switchover valve and in which an exhaust gas is always passed through an adsorbent during operation of an engine, the HC-desorption temperature may be increased up to a level at which a catalyst is activated (in general, on the order of 300°), but in a system designed so that only when a catalyst is inactivated, a switchover valve permits an exhaust gas to flow through an adsorbent (at this time, the temperature of the exhaust gas is relatively low), and after activation of the catalyst, the exhaust gas is passed through a bypass passage without flowing through the adsorbent, as in the present invention, the temperature of the adsorbent itself is difficult to rise. Therefore, to desorb the HC quickly, it is desirable that when the temperature of the adsorbent has reached a level or more during adsorption (generally on the order of 50 to 100° C.), the desorption is started, and completed generally at a temperature equal to or lower than 250° C. Particularly, to ensure that even when the vehicle is moved to travel for a short time (for example, for 500 seconds from the start) in a cold season or in a cold district, the adsorbed HC is desorbed sufficiently, and the adsorbing performance is not detracted at the next starting of the engine, it is desirable that the desorption temperature is equal to or lower than 225° C. Further, if the desorption temperature is equal to or lower than 210° C., the adsorbed HC is desorbed quickly from the adsorbent in an extremely short time (for example, for 250 seconds) from the start even in the cold season or in the cold district in most of internal combustion engines irrespective of the structure and size of the HC-adsorbing system and the like and hence, a reduction in adsorbing performance at the next start of the engine can be avoided further effectively.

In this way, with the second feature of the present invention, the amount of the zeolite added, which has an adsorbing ability for HCs having a larger molecular weight, but which has pores of such a particular small diameter (equal to or larger than 6 Å and smaller than 7 Å) that the desorption of the adsorbed HC is difficult to occur, is suppressed to smaller than 20% by weight. Therefore, the increase in desorption temperature caused by such addition of the zeolite can be suppressed to a level (equal to or lower than 250° C.) causing no problem.

According to a third aspect and feature of the present invention, in addition to the second feature, at least one of a ferrierite-type zeolite and a pentasil-type zeolite is selected as the zeolite having the pores of the small diameter equal to or larger than 3.5 Å and smaller than 6 Å and no pore of the small diameter equal to or larger than 6 Å and smaller than 7 Å, and a faujasite-type zeolite is selected as the zeolite having the pores of the small diameter equal to or larger than 7 Å and smaller than 10 Å and no pore of the small diameter equal to or larger than 6 Å and smaller than 7 Å. For the ferrierite-type zeolite, for example, ferrierite has two types of pore sizes of 4.2×5.4 Å and 3.5×4.8 Å due to its crystalline structure. For the pentasil-type zeolite, for example, ZSM-5 has two types of pore sizes of 5.3×5.6 Å and 5.1×5.5 Å due to its crystalline structure. For the faujasite-type zeolite, for example, USY has one type of a pore size of 7.4×7.4 Å due to its crystalline structure. These zeolites are suitable for achieving the above-described effect.

According to a fourth aspect and feature of the present invention, in addition to the second feature, a ferrierite-type zeolite and a pentasil-type zeolite are selected as the zeolite having the pores of the small diameter equal to or larger than 3.5 Å and smaller than 6 Å and no pore of the small diameter equal to or larger than 6 Å and smaller than 7 Å, and a faujasite-type zeolite is selected as the zeolite having the pores of the small diameter equal to or larger than 7 Å and smaller than 10 Å and no pore of the small diameter equal to or larger than 6 Å and smaller than 7 Å, and in a three-component composition diagram in which each of ratios is indicated by one point within an equilateral triangle having three apexes each indicating the case where the mixture includes only one of zeolite components, the weight ratio of the ferrierite-type, pentasil-type and faujasite-type zeolites is set to lie in a region surrounded by a line segment connecting a point of (0:0.2:0.8), a point of (0.08:0.12:0.8), a point of (0.4:0.08:0.52), a point of (0.67:0.1:0.23), a point of (0.67:0.23:0.1), a point of (0.4:0.51:0.09), a point of (0.09:0.81:0.1) and a point of (0:0.81:0.19) to one another. The ferrierite-type zeolite has a good adsorbing ability for HC having a particularly small molecular diameter; the pentasil-type zeolite has a good adsorbing ability for HC having a slightly small molecular diameter, and further, the faujasite-type zeolite has a good adsorbing ability for HC having a relatively large molecular diameter. If the ratio of the three components is prejudiced largely, a reduction in HC-adsorption rate is observed, as apparent from FIG. 7. However, if the ratio of the three zeolites is set with a good balance to the utmost as in the fourth feature, the adsorption rate can be improved relatively (to 73.0% or more), leading to enhanced HC-removing efficiency.

With such fourth feature of the present invention, the weight ratio of the zeolite ferrierite-type zeolite having the good adsorbing ability for the HC having the particularly small molecular diameter, the pentasil-type zeolite having the good adsorbing ability for the HC having the slightly small molecular diameter and the faujasite-type zeolite having the good adsorbing ability for the HC having the large molecular diameter is set with the good balance to the utmost in the particular range. Therefore, it is possible to avoid a reduction in adsorption rate due to the prejudice of the ratio to the utmost to improve the adsorption rate relatively.

According to a fifth aspect and feature of the present invention, in addition to the second feature, a ferrierite-type zeolite and a pentasil-type zeolite are selected as the zeolite having the pores of the small diameter equal to or larger than 3.5 Å and smaller than 6 Å and no pore of the small diameter equal to or larger than 6 Å and smaller than 7 Å, and a faujasite-type zeolite is selected as the zeolite having the pores of the small diameter equal to or larger than 7 Å and smaller than 10 Å and no pore of the small diameter equal to or larger than 6 Å and smaller than 7 Å, and in a three-component composition diagram in which each of ratios is indicated by one point within an equilateral triangle having three apexes each indicating the case where the mixture includes only one of zeolite components, the weight ratio of the ferrierite-type, pentasil-type and faujasite-type zeolites is set to lie in a region surrounded by a line segment connecting a point of (0.1:0.18:0.72), a point of (0.4:0.16:0.44), a point of (0.55:0.2:0.25), a point of (0.55:0.25:0.2), a point of (0.4:0.43:0.17), a point of (0.1:0.7:0.2), a point of (0.02:0.58:0.4) and a point of (0.03:0.4:0.57) to one another. If the ratio of the ferrierite-type, pentasil-type and faujasite-type zeolites is set with a good balance as in the fifth feature, the adsorption rate can be improved (74.5% or more), leading to a further enhanced HC-removing efficiency. This is convenient for clearing a high-level exhaust emission control.

In this way, with the fifth feature of the present invention, the component weight ratio of the three zeolites is set with the good balance in the particular range. Therefore, it is possible to avoid a reduction in adsorption rate due to the prejudice of the ratio to the utmost to improve the adsorption rate particularly, and hence, it is possible to accommodate a higher-level exhaust emission control sufficiently.

According to a sixth aspect and feature of the present invention, in addition to the third, fourth or fifth feature, the content of Al in the faujasite-type zeolite is defined to be equal to or lower than 1% by weight. The durability of the faujasite-type zeolite such as the heat resistance, the caulking resistance and the like is good, if the content of Al in the zeolite is equal to or lower than 1% by weight (particularly good if the content of Al in the zeolite is equal to or lower than 0.5% by weight). Therefore, with the sixth feature, durability of the faujasite-type zeolite such as the heat resistance, the caulking resistance and the like is ensured sufficiently, and even if the zeolite is exposed to an exhaust gas or soot produced upon the incomplete combustion, the reduction in adsorbing performance of the adsorbent is suppressed effectively.

According to a seventh aspect and feature of the present invention, in addition to the second, third, fourth or fifth features, at least a ferrierite-type zeolite is selected as the zeolite having the pores of the small diameter equal to or larger than 3.5 Å and smaller than 6 Å and no pore of the small diameter equal to or larger than 6 Å and smaller than 7 Å, the content of Al in the ferrierite-type zeolite being defined to be equal to or lower than 1% by weight. Moisture is contained in an amount of approximately 10% in an exhaust gas and hence, if the content of Al in the zeolite is large, the zeolite is hydrophilic, thereby providing such a tendency that the amount of water adsorbed is increased, while the amount of HCs adsorbed is correspondingly decreased. However, with the seventh feature, the content of Al in the ferrierite-type zeolite is defined to is equal to or lower than 1% by weight. Therefore, the chemical adsorbing force of the zeolite can be reduced to avoid a rise in HC-desorption temperature. Moreover, the hydrophobic nature of the zeolite can be enhanced to increase the amount of HCs adsorbed physically, thereby ensuring a sufficient HC-adsorbing ability.

According to an eighth aspect and feature of the present invention, in addition to any of the second to fifth features, the content of the zeolite having the pores of the small diameter equal to or larger than 6 Å and smaller than 7 Å in the mixture is defined to be lower than 3% by weight, and the desorption temperature for the adsorbed HCs is defined to be equal to or lower than 225° C. If the amount of zeolite added which has the pores of the small diameter equal to or larger than 6 Å and smaller than 7 Å is lower than 3% by weight, as described above, the desorption temperature can be suppressed to a level equal to or lower than 225° C. (the desorption rate is 95% or higher at 200° C.). In this case, a reduction in next adsorption rate is equal to or lower than 1%, which provides no problem. Thus, with the eighth feature, even when the vehicle is moved to travel for a short time in a cold season or in a cold district, the adsorbed HCs are desorbed quickly and sufficiently, and the reduction in adsorbing performance at the next start of the engine can be avoided effectively.

According to a ninth aspect and feature of the present invention, in addition to any of the second to fifth features, the content of the zeolite having the pores of the small diameter equal to or larger than 6 Å and smaller than 7 Å in the mixture is defined to be lower than 1% by weight, and the desorption temperature for the adsorbed HCs is defined to be equal to or lower than 210° C. If the amount of zeolite added which has the pores of the small diameter equal to or larger than 6 Å and smaller than 7 Å is lower than 1% by weight, as described above, the desorption temperature can be suppressed to a level equal to or lower than 210° C. (the desorption rate is 99% or more at 200° C.) equivalent to that when the content of the zeolite having the pores of the small diameter equal to or larger than 7 Å is 100% by weight. In this case, a reduction in next adsorption rate is equal to or lower than 0.2%, which provides no problem. Thus, with the ninth feature, even when the vehicle is moved to travel for an extremely short time in a cold season or in a cold district, the adsorbed HCs can be desorbed quickly from the adsorbent irrespective of the structure and size of the HC-adsorbing system and the like (the desorption rate is 99% or more at 200° C.), and the reduction in adsorbing performance at the next start of the engine can be avoided further effectively.

The above and other objects, features and advantages of the invention will become apparent from the following description of the preferred embodiment taken in conjunction with the accompanying drawings.

BRIEF DESCRIPTION OF THE DRAWINGS

FIG. 6 is a graph and a table showing the relationship between the HC-adsorption rate and the temperature for the zeolites;

FIG. 7 is a graph and a table showing the relationship between the component ratio of the zeolites and the adsorption rate;

FIG. 12 is a graph showing a transition in temperature of an adsorbent after starting of an engine in an actual vehicle.

DESCRIPTION OF THE PREFERRED EMBODIMENT

Figure 1:
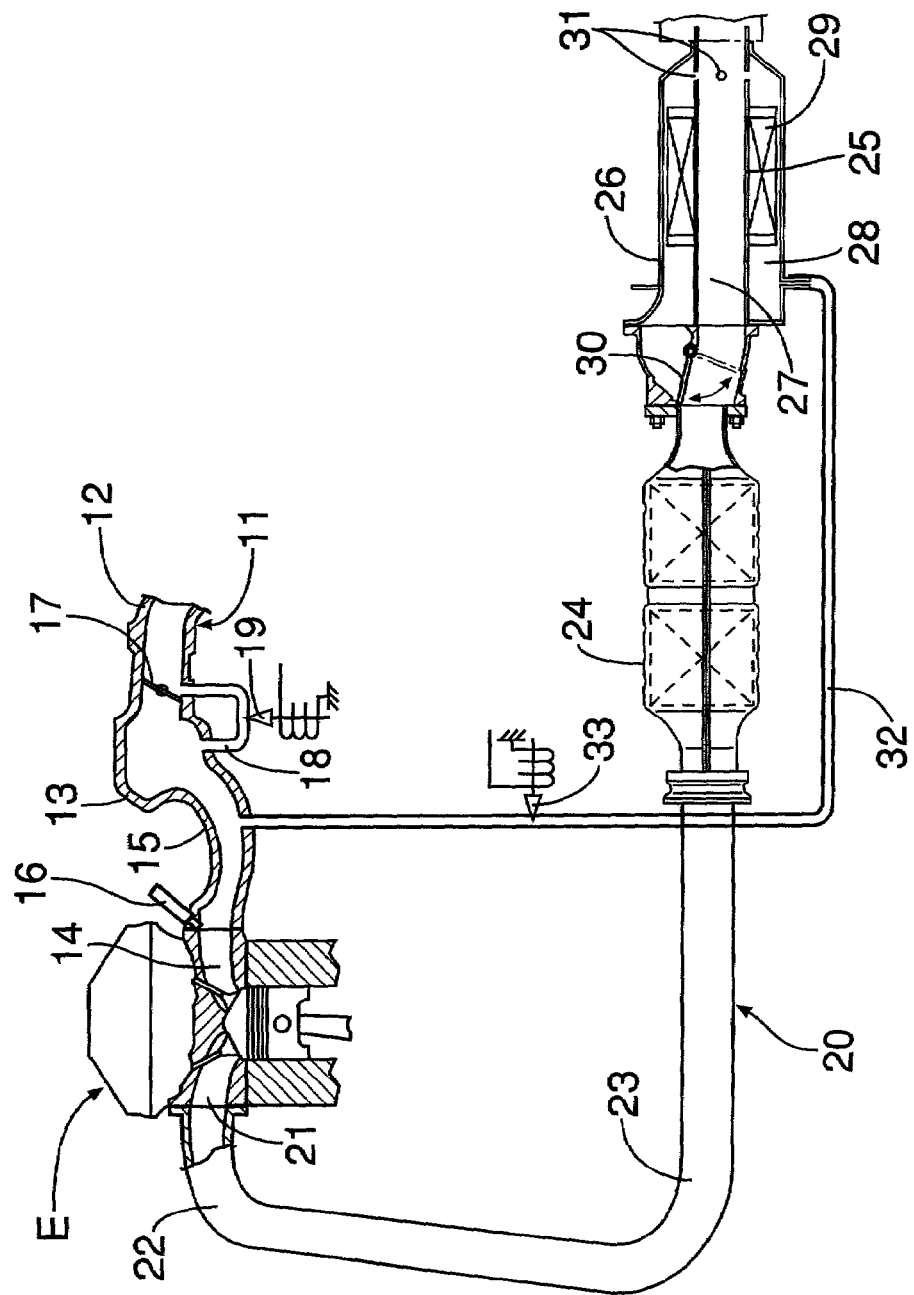
FIG. 1 is a schematic view showing an intake system and an exhaust system in an internal combustion engine.

Referring first to FIG. 1, an intake system 11 in a multi-cylinder internal combustion engine E includes an intake pipe 12 connected at its upstream end to an air cleaner (not shown), a surge tank 13 connected to a downstream end of the intake pipe 12, and an intake manifold 15 connecting an intake port 14 in each of cylinders and the surge tank 13 to each other. A fuel injection valve 16 is mounted in the intake manifold 15 in the vicinity of the intake port 14. A bypass pipe 18 is connected to the intake pipe 12 to bypass a throttle valve 17 disposed in the intake pipe 12, and an air control valve 19 is disposed in the bypass pipe 18.

An exhaust system 20 in the internal combustion engine E includes an exhaust manifold 22 connected at its upstream end to an exhaust port 21 in each of the cylinders, a first exhaust pipe 23 connected commonly to a downstream end of the exhaust manifold 22, a catalytic converter 24 connected to a downstream end of the first exhaust pipe 23 and including an exhaust emission control catalyst, a second exhaust pipe 25 having a main exhaust passage 27 defined therein and capable of guiding an exhaust gas passed through the catalytic converter 24, an exhaust gas case 26 which covers the second exhaust pipe 25 to define an annular sub-exhaust pipe 28 arranged outside and in parallel to the main exhaust passage 27, and a switchover valve 30 adapted to guide the exhaust gas from the catalytic converter 24 selectively to the main exhaust passage 27 and the sub-exhaust passage 28 in a switching manner. The exhaust gas flowing through the main exhaust passage 27 and the sub-exhaust passage 28 is discharged to the outside via an exhaust muffler (not shown).

An HC adsorber 29 is included the sub-exhaust passage 28. The HC adsorber 29 is disposed in an intermediate portion of the sub-exhaust passage 29 in such a manner that inner and outer peripheries thereof are supported by an outer surface of an intermediate portion of the second exhaust pipe 25 and an inner surface of an intermediate portion of the exhaust gas case 26, and the exhaust gas introduced into the sub-exhaust passage 28 flows through the HC adsorber 29. A plurality of communication bores 31 are provided in the second exhaust pipe 25 at a location downstream from the position of disposition of the HC adsorber 29 to lead to a downstream end of the sub-exhaust passage 28, and the exhaust gas flowing through the HC adsorber 29 flows from the communication bores 31 via the downstream end of the main exhaust passage 27 toward the exhaust muffler.

Figure 2:
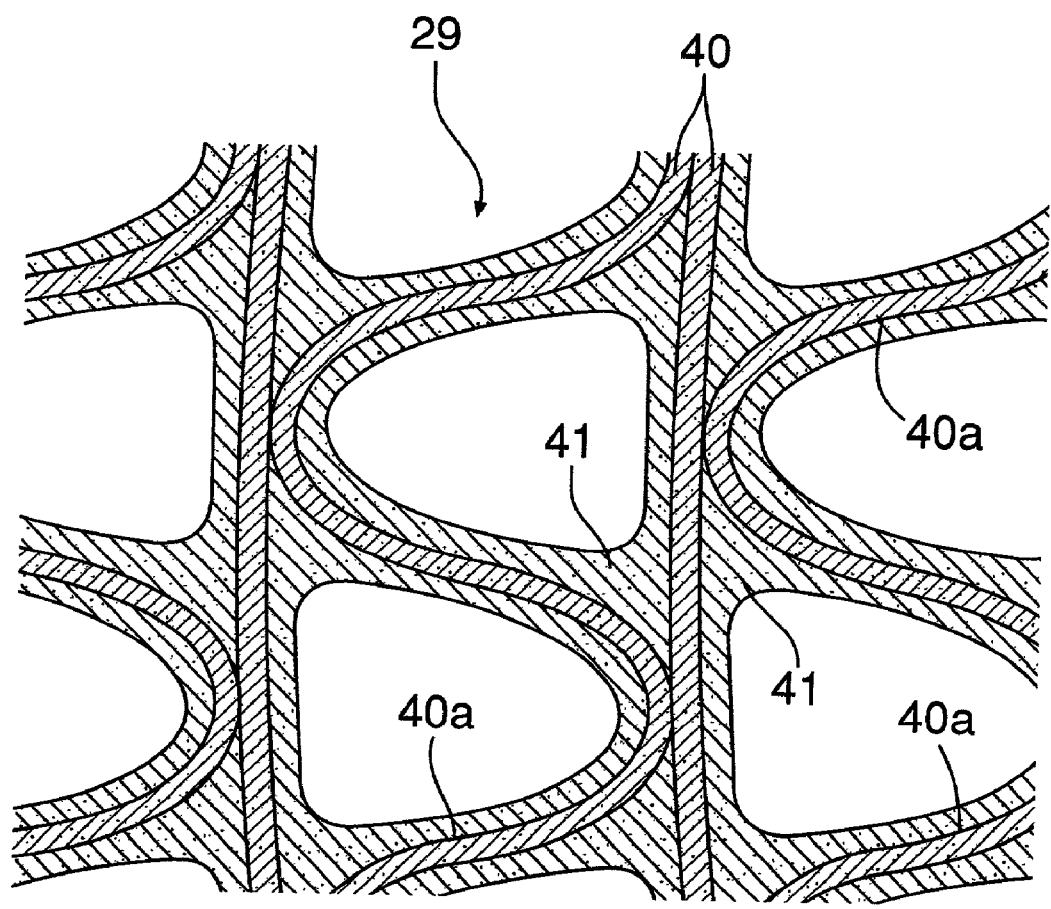
FIG. 2 is a partially enlarged sectional view of an HC adsorber.

As illustrated in FIG. 2, the HC adsorber 29 is comprised of a carrier 40 such as a metal honeycomb or the like having a large number of cells through which the exhaust gas can flow, and an adsorption layer 41 retained on an inner surface 40a of each of the cells in the carrier 40. The adsorption layer 41 is comprised of an adsorbent according to the present invention, which comprises a mixture of zeolite particles and is capable of adsorbing HC in the exhaust gas, and a binder for binding the zeolite particles of the adsorbent integrally with one another.

A return line 32 for returning a unburned HC component desorbed from the adsorbent in the HC adsorber 29 to the intake system 11 is provided between a portion of the sub-exhaust passage 28 upstream of the HC adsorber 29 and a portion of the intake system 11 downstream of the throttle valve 17. A normally-closed return control valve 33 is provided in the middle of the return line 32 and adapted to be opened in a state in which the HC adsorber 29 has reached a temperature permitting the desorption of the unburned HC component after starting of the internal combustion engine E.

The switchover valve 30 is adapted to switch over the flow of the exhaust gas, so that when the catalyst in the catalytic converter 24 does not still reach an activating temperature after starting of the internal combustion engine E, the exhaust gas from the catalytic converter 24 is conducted to the sub-exhaust passage 28 to flow through the adsorber 29 in order to prevent the unburned HC component from being discharged to the outside without being converted, and after the catalyst rises to the activating temperature, the exhaust gas from the catalytic converter 24 is conducted to the main exhaust passage 27. In the adsorber 29, the adsorbent contained in the adsorption layer 41 adsorbs the unburned HC component in the exhaust gas flowing through the adsorber 29, and desorbs the adsorbed HC in response to rising of the temperature of the adsorbent, and the desorbed HC is returned via the return line 32 to the intake system and burned in the engine E.

Types of zeolite capable of being utilized as a component for the adsorbent are given in Table 1

TABLE 1

| Short diameter of pores | Skeletal structure | Structure type | Name |
| --- | --- | --- | --- |
| Equal to or larger than | Ferrierite-type | FER $\underline{4.2} \times 5.4$ Å | Ferrierite Gallosilicate |
| 3.5 Å and smaller than 6.0 Å (including no pore equal to or larger than 6.0 Å and smaller than 7.0 Å) | Pentasil-type | $\underline{3.5} \times 4.8$ Å MFI $\underline{5.3} \times 5.6$ Å $\underline{5.1} \times 5.5$ Å MEL $5.3 \times 5.4$ Å | FER ZSM-5 Silicalite Gallosilicate MFI ZSM-11 Silicalite 2 |
| Equal to or larger than 7.0 Å and smaller than 10.0 Å (including no pore equal to or larger than 6.0 Å and smaller than 7.0 Å) | Faujasite-type | FAU $\underline{7.4} \times 7.4$ Å | Faujasite X Y USY Gallosilicate FAU |
| Equal to or larger than 6.0 Å and smaller than 7.0 Å | mordenite-type Beta-type | MOR $\underline{6.5} \times 7.0$ Å $\underline{2.6} \times 5.7$ Å BEA $7.6 \times \underline{6.4}$ Å $\underline{5.5} \times 5.5$ Å | Mordenite Gallosilicate MOR Beta Gallosilicate BEA |

Each of underlined numerals indicates a short diameter of pores having pore sizes Examples of the adsorber 29 will be described below.

EXAMPLE 1

Charged into a polyethylene bottle were an adsorbent comprising 33.3 parts of a powder of ferrierite-type zeolite having a ratio of $SiO_2/Al_2O_3$ equal to 93 (33.3% by weight in the total zeolite amount), 33.3 parts of a powder of MFI-type metallosilicate (pentasil type) having a ratio of $SiO_2/Ga_2O_3$ equal to 500 (33.3% by weight in the total zeolite amount) and 33.3 parts of a power of USY-type (faujasite type) zeolite having a ratio of $SiO_2/Al_2O_3$ equal to 360 (33.3% by weight in the total zeolite amount), and 50 parts of silica sol and 150 parts of pure water as a binder along with alumina balls. The resulting mixture was pulverized and mixed for 12 hours by a ball mill to provide a slurry. A cordierite honeycomb (carrier) having a diameter of 1 inch, a length of 60 mm and 300 cells of 10.5 mil was immersed in the slurry and then calcined, thereby producing an adsorber including an adsorber coated in an amount of 100 g/l to the honeycomb.

EXAMPLE 2

An adsorbent comprising only 100 parts of a powder of ferrierite-type zeolite having a ratio of $SiO_2/Al_2O_3$ equal to 93 and 50 parts of silica sol and 200 parts of pure water as a binder were charged into a polyethylene bottle along with alumina balls. Subsequently, treatments were carried out in the same manner as in Example 1 to provide an adsorber including an adsorbent coated in an amount of 100 g/l to a honeycomb.

EXAMPLE 3

An adsorbent comprising only 100 parts of a powder of MFI-type metallosilicate (pentasil type) having a ratio of $SiO_2/Ga_2O_3$ equal to 500 and 50 parts of silica sol and 70 parts of pure water as a binder were charged into a polyethylene bottle along with alumina balls. Subsequently, treatments were carried out in the same manner as in Example 1 to provide an adsorber including an adsorbent coated in an amount of 100 g/l to a honeycomb.

EXAMPLE 4

An adsorbent comprising only 100 parts of a powder of USY-type (faujasite type) zeolite having a ratio of $SiO_2/Al_2O_3$ equal to 360 and 50 parts of silica sol and 190 parts of pure water as a binder were charged into a polyethylene bottle along with alumina balls. Subsequently, treatments were carried out in the same manner as in Example 1 to provide an adsorber including an adsorbent coated in an amount of 100 g/l to a honeycomb.

EXAMPLE 5

An adsorbent comprising only 100 parts of a powder of beta-type zeolite having a ratio of $SiO_2/Al_2O_3$ equal to 1,700 and 50 parts of silica sol and 200 parts of pure water as a binder were charged into a polyethylene bottle along with alumina balls. Subsequently, treatments were carried out in the same manner as in Example 1 to provide an adsorber including an adsorbent coated in an amount of 100 g/l to a honeycomb.

EXAMPLE 6

An adsorbent comprising only 100 parts of a powder of mordenite-type zeolite having a ratio of $SiO_2/Al_2O_3$ equal to 240 and 50 parts of silica sol and 180 parts of pure water as a binder were charged into a polyethylene bottle along with alumina balls. Subsequently, treatments were carried out in the same manner as in Example 1 to provide an adsorber including an adsorbent coated in an amount of 100 g/l to a honeycomb.

The adsorbers in Examples 1 to 6 were subjected to an adsorbed-HC desorbing test using measuring conditions and eight types of HC gases given in Table 2 below.

TABLE 2

| Conditions for estimating model gas | Type of HC gas used |
|---|---|
| Estimating device: | Ethane ($C_2H_6$) |
| Ambient-pressure fixed flow-type | Propylene ($C_3H_6$) |
| Capacity of catalyst: 0.031 | Butane ($C_4H_{10}$) |
| Composition of gas: | 1-pentane ($C_5H_{10}$) |
| HC: 600 ppm C | Benzene ($C_6H_6$) |
| $CO_2$: 14% | Toluene ($C_7H_8$) |
| $O_2$: 0.5% | m-xylene ($C_8H_{10}$) |
| CO: 0.5% | 2,2,4-trimethyl-pentane ($C_8H_{18}$) |
| NO: 500 ppm | |
| $H_2$: 0.17% | |
| $H_2O$: 10% | |
| $N_2$: balance | |
| Flow rate of gas: 25 L/min | |
| Measuring temperature: 45–300° C. | |
| Temperature rise rate: 20° C./min | |

Figure 5:
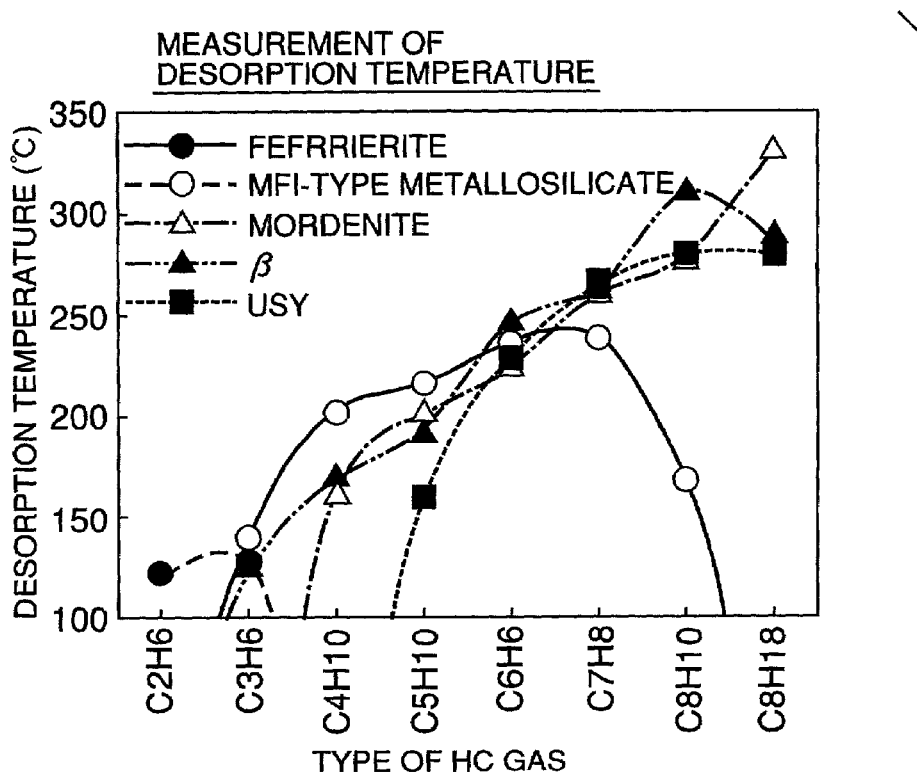
FIG. 5 is a graph and a table showing results of the measurement of an HC-desorption temperature for various zeolites.

Results at desorption temperatures in the test are shown in a graph and a table in FIG. 5. It was made clear from the graph and table in FIG. 5 that the desorption temperature particularly for high-molecular HC was high in the case of the beta-type and mordenite-type zeolites having pores of a small diameter equal to or larger than 6 Å and smaller than 7 Å, and the desorption temperature was relatively low in the case of the ferrierite-type zeolite and MFI-type metallosilicate (pentasil-type) zeolite each having pores of a small diameter equal to or larger than 3.5 Å and smaller than 6 Å and having no pore of a small diameter equal to or larger than 6 Å and smaller than 7 Å and with the USY-type (faujasite type) zeolite having pores of a small diameter equal to or larger than 7 Å and smaller than 10 Å and having no pore of a small diameter equal to or larger than 6 Å and smaller than 7 Å.

In addition, the adsorbers in Examples 1 to 6 were subjected to an adsorbed-HC desorbing test using measuring conditions and HC gases given in Table 3 below.

TABLE 3

| Conditions for estimating model gas | Hydrocarbon type measured |
|---|---|
| Estimating device: | Ferrierite: $C_3H_6$ |
| Ambient-pressure fixed flow-type | MFI-type metallosilicate: $C_7H_8$ |
| Capacity of catalyst: 0.03 L | USY: $C_8H_{10}$ |
| Composition of gas: | Mordenite: $C_8H_{18}$ |
| HC: 600 ppm C | β: $C_8H_{10}$ |
| $CO_2$: 14% | Ternary Mixture: Mixture of 8 HCs |
| $O_2$: 0.5% | (see the following table) |
| CO: 0.5% | |
| NO: 500 ppm | |
| $H_2$: 0.17% | |
| $H_2O$: 10% | |
| $N_2$: balance | |
| Flow rate of gas: 25 L/min | |
| Measuring temperature: 45–300° C. | |
| Temperature rise rate: 20° C./min | |

| Mixture of 8 HCs | | |
|---|---|---|
| Mixture of 8 HCs | Concentration (ppmC) | Proportion |
| Ethane ($C_2H_6$) | 60 | 10% |
| Propane ($C_3H_6$) | 39 | 7% |
| 1-butene ($C_4H_8$) | 33 | 6% |
| MTBE ($C_5H_{12}O$) | 54 | 9% |
| Benzene ($C_6H_6$) | 61 | 10% |
| Toluene ($C_7H_8$) | 205 | 34% |
| m,p-xylene ($C_8H_{10}$) | 43 | 7% |
| 2,2,4-trimethylpentane ($C_8H_{18}$) | 105 | 18% |
| TOTAL | 600 | 100% |

Figure 3:
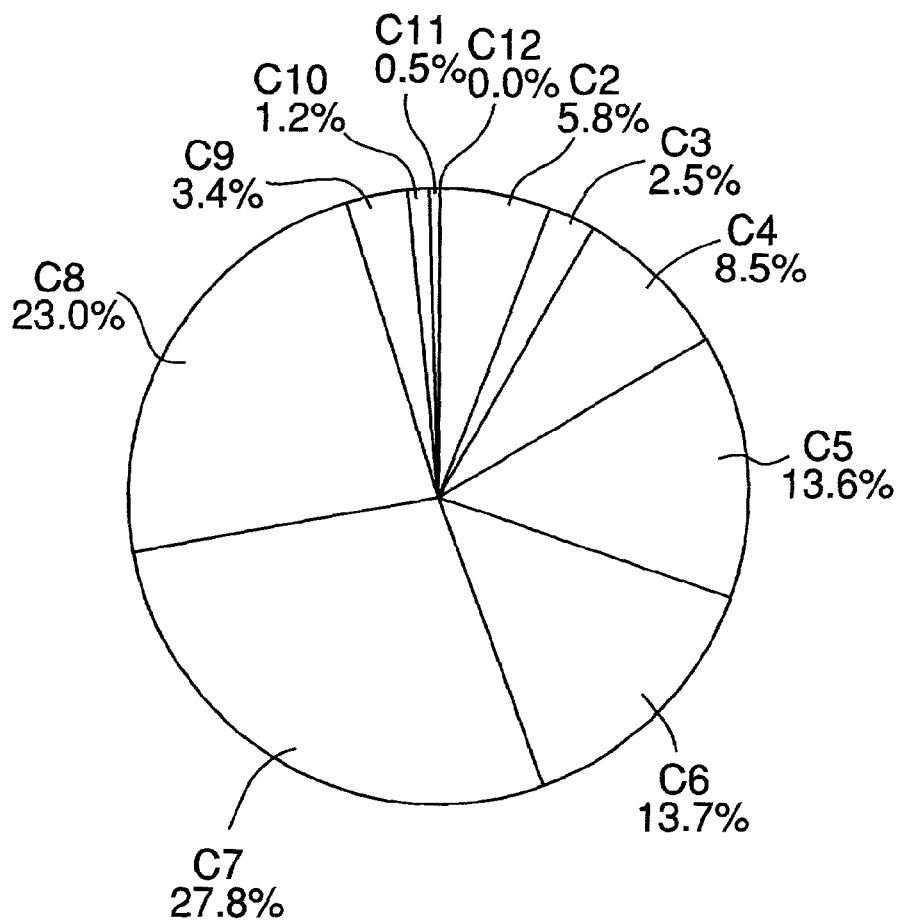
FIG. 3 is a graph showing the proportions of hydrocarbons (HCs) contained in an exhaust gas and having various numbers of carbon atoms.
Figure 4:
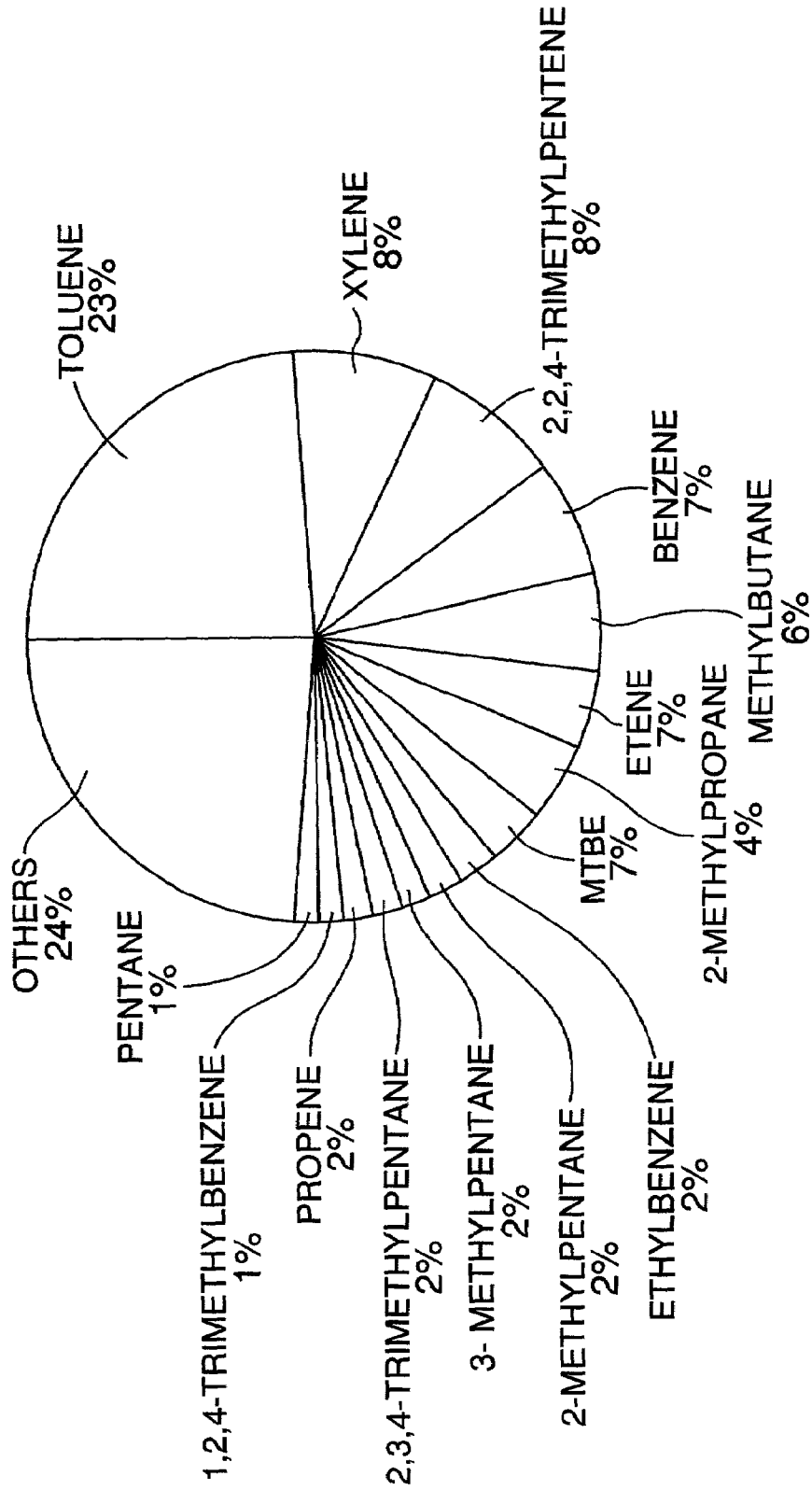
FIG. 4 is a graph showing the proportions of types of HCs in the exhaust gas.

Mixture of 8HCs In this case, the types of HC used are the gas showing a highest desorption temperature in the graph and table in FIG. 5 for the powder of single zeolite, and the eight types of mixed gases in FIG. 3 for the mixtures of the three types of zeolite powders. Results of the measurement of desorption rate in this case are shown in a graph and a table in FIG. 6. It can be seen from FIG. 6 that a high temperature is required for the desorption with both the beta-type and the mordenite-type zeolite powders having the pores of the small diameter equal to or larger than 6 Å and smaller than 7 Å.

In addition, for the adsorbent comprising the ferrierite-type and the MFI-type metallosilicate (pentasil-type) zeolites selected as the zeolite having the pores of the small diameter equal to or larger than 3.5 Å and smaller than 6 Å and having no pore of the small diameter equal to or larger than 6 Å and smaller than 7 Å, and for the adsorbent comprising the USY-type (faujasite type) zeolite selected as the zeolite having the pores of the small diameter equal to or larger than 7 Å and smaller than 10 Å and having no pore of the small diameter equal to or larger than 6 Å and smaller than 7 Å, the relationship between the ratio of the three zeolite components and the HC-adsorption rate was examined by an experiment, thereby providing results shown in a graph and a table in FIG. 7. The graph in FIG. 7 is a three-component composition diagram in which the weight ratio of the three zeolite components is indicated by one point within an equilateral triangle. Three apexes of the equilateral triangle correspond to only the individual corresponding components, i.e., to a component ratio of 1.0 (100% in terms of percentage).

It can be seen from this graph that if the ratio of the components is prejudiced largely, a reduction in adsorption rate is observed. Therefore, it can be seen that if the ratio of the ferrierite-type, MFI-type metallosilicate (pentasil-type) and USY-type (faujasite type) zeolite components is set to lie, for example, in a particular inside region A surrounded by a line segment a connecting a point of (0:0.2:0.8), a point of (0.08:0.12:0.8), a point of (0.4:0.08:0.52), a point of (0.67:0.1:0.23), a point of (0.67:0.23:0.1), a point of (0.4:0.51:0.09), a point of (0.09:0.81:0.1) and a point of (0:0.81:0.19) to one another, the adsorption rate can be relatively improved (73.0% or more).

In addition, it can be seen that if the ratios of the ferrierite-type, MFI-type metallosilicate (pentasil-type) and USY-type (faujasite type) zeolite components are set to lie in a further inner particular inside region B surrounded by a line segment b connecting a point of (0.1:0.18:0.72), a point of (0.4:0.16:0.44), a point of (0.55:0.2:0.25), a point of (0.55:0.25:0.2), a point of (0.4:0.43:0.17), a point of (0.1:0.7:0.2), a point of (0.02:0.58:0.4) and a point of (0.03:0.4:0.57) to one another, the adsorption rate can be particularly improved (74.5% or more). Therefore, this case is effective for clearing the exhaust emission control of a higher level (for example, a severest control value in an LEV control in California).

Figure 8:
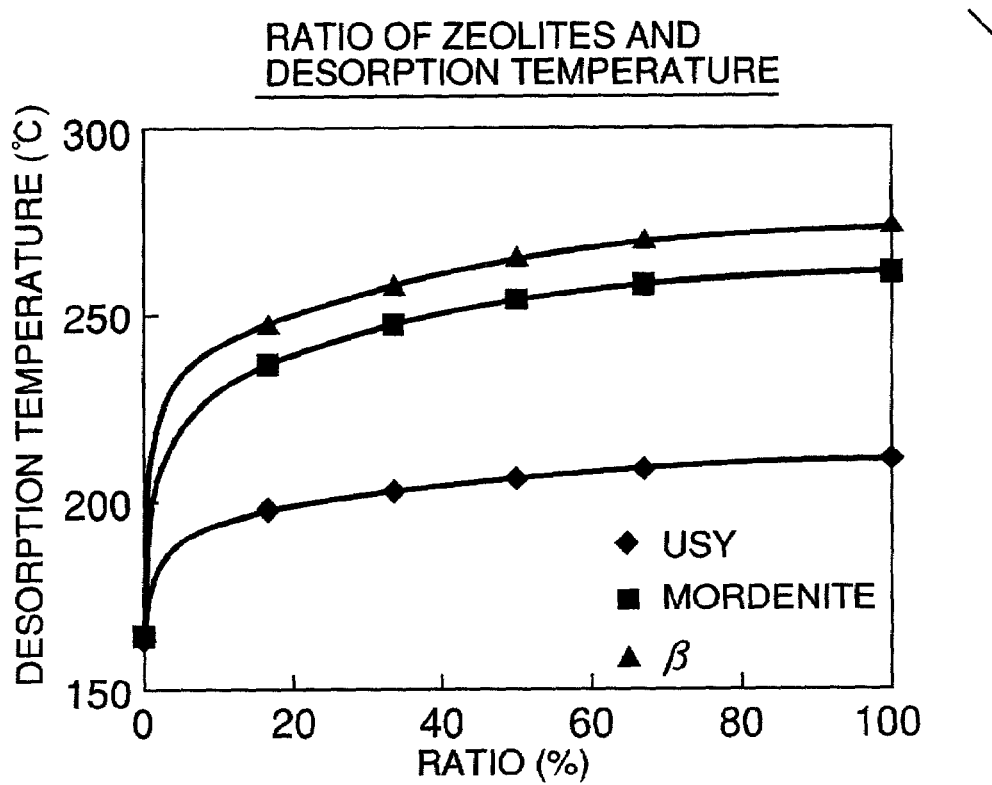
FIG. 8 is a graph and a table showing the relationship between the ratio of the zeolites and the desorption temperature.

For zeolites capable of adsorbing HCs of C8 to C11 (which means hydrocarbons having eight to eleven carbon atoms) and particularly requiring a high desorption temperature, the desorption temperature was examined with the content (% by weight) per the entire zeolite amount varied. In this case, a mixture of the ferrierite-type zeolite and the MFI-type metallosilicate (pentasil-type) zeolite with a ratio of 1:1 was used as the remaining zeolite components. Results of this experiment are shown in a graph and a table in FIG. 8. It can be seen from this graph that when the proportions of these zeolite components are increased, the desorption temperature rises. Particularly, for the beta-type and mordenite-type zeolite components, the desorption temperature is considerably high, even if their contents are relatively small. It can be also seen that if the contents of the beta-type and mordenite-type zeolite components are equal to or lower than 20% by weight, the desorption temperature can be suppressed to a value equal to or lower than 250° C., that if the content is equal to or lower than 3% by weight, the desorption temperature can be suppressed to a value equal to or lower than 225° C., and that the content is equal to or lower than 1% by weight, the desorption temperature can be suppressed to a value equal to or lower than 210° C. On the other hand, it can be seen that even if the USY-type (faujasite type) zeolite is of the total zeolite amount (a content of 100%), the desorption temperature is 212° C. (i.e., equivalent to that when the content of the beta-type zeolite and the mordenite-type zeolite is equal to or lower than 1% by weight), and the desorption temperature can be totally suppressed to a low value.

Figure 9:
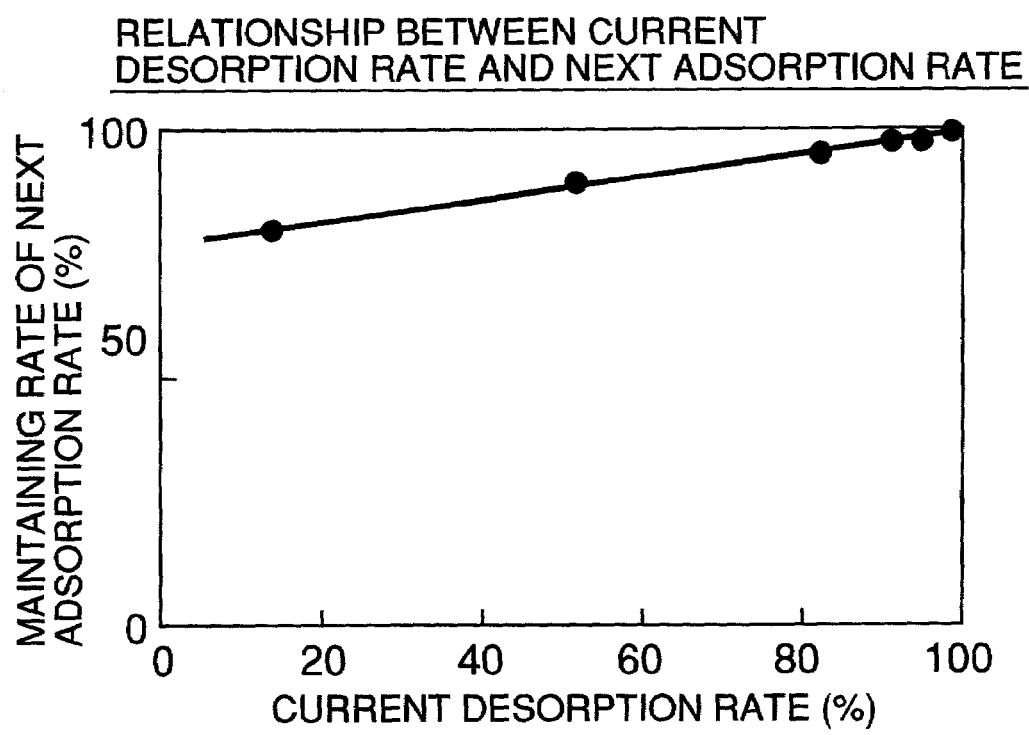
FIG. 9 is a graph and a table showing the relationship between the current desorption rate and the next desorption rate.

FIG. 9 shows results of the examination of the relationship between the current desorption rate in the adsorbent and the next HC-adsorption rate (at the start of the engine). It can be seen from this graph that if the current desorption rate is not 100%, the next adsorption rate is decreased. If the current desorption rate is equal to or higher than 90%, the decrease in the next adsorption rate is suppressed to 2% or less. Further, if the current desorption rate is equal to or higher than 95%, the decrease in the next adsorption rate is suppressed to 1% or less. Yet further, if the current desorption rate is equal to or higher than 99%, the decrease in the next adsorption rate is suppressed to 0.2% or less.

To carry out a heat-resistance test for the ferrierite-type zeolite and the USY-type (faujasite-type) zeolite, each of samples of the examples 2 and 4 were subjected to an aging for 20 hours at 900° C. in a flow-type tubular furnace through which a gas comprising 1% of $O_2$, 10% of $H_2$ and the balance of $N_2$ flows at a flow rate of 1 L per minute and thereafter, an adsorption rate was measured under conditions shown in Table 4. In this case, the relationship between the content of Al in the ferrierite-type zeolite and the adsorption rates before and after the heat-resistance test is shown in FIG. 10, and the relationship between the content of Al in USY-type (faujasite-type) zeolite and the adsorption rates before and after the heat-resistance test is shown in FIG. 11.

Figure 10:
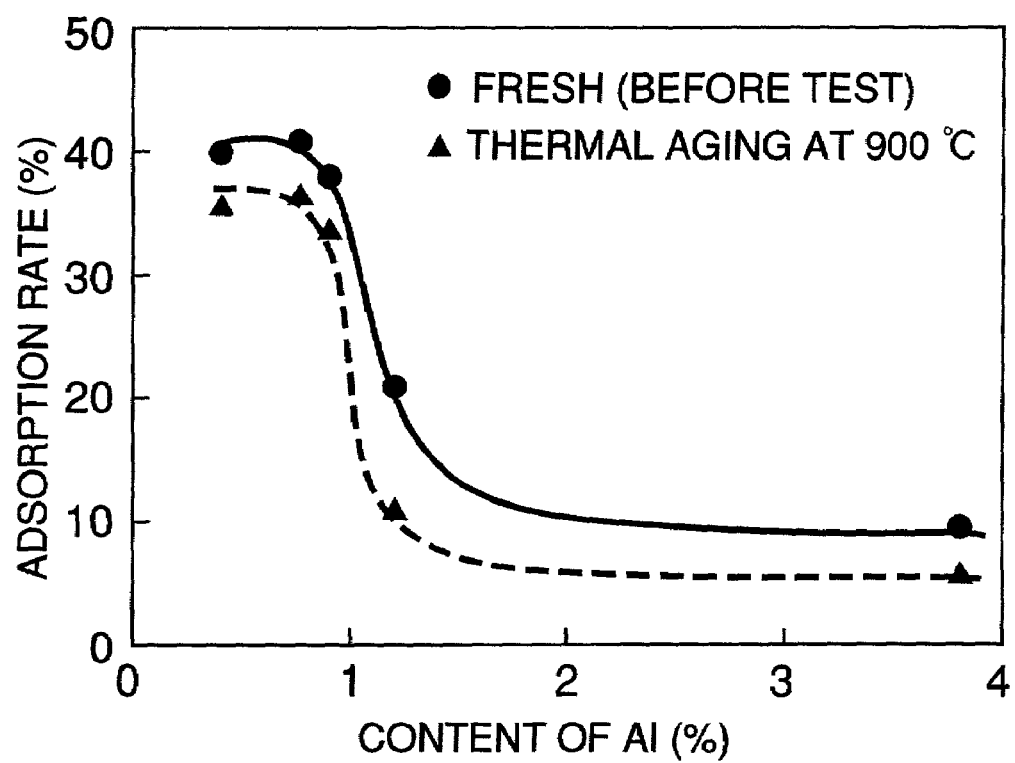
FIG. 10 is a graph and a table showing the relationship between the content of Al in the ferrierite and the HC-adsorption rate.
Figure 11:
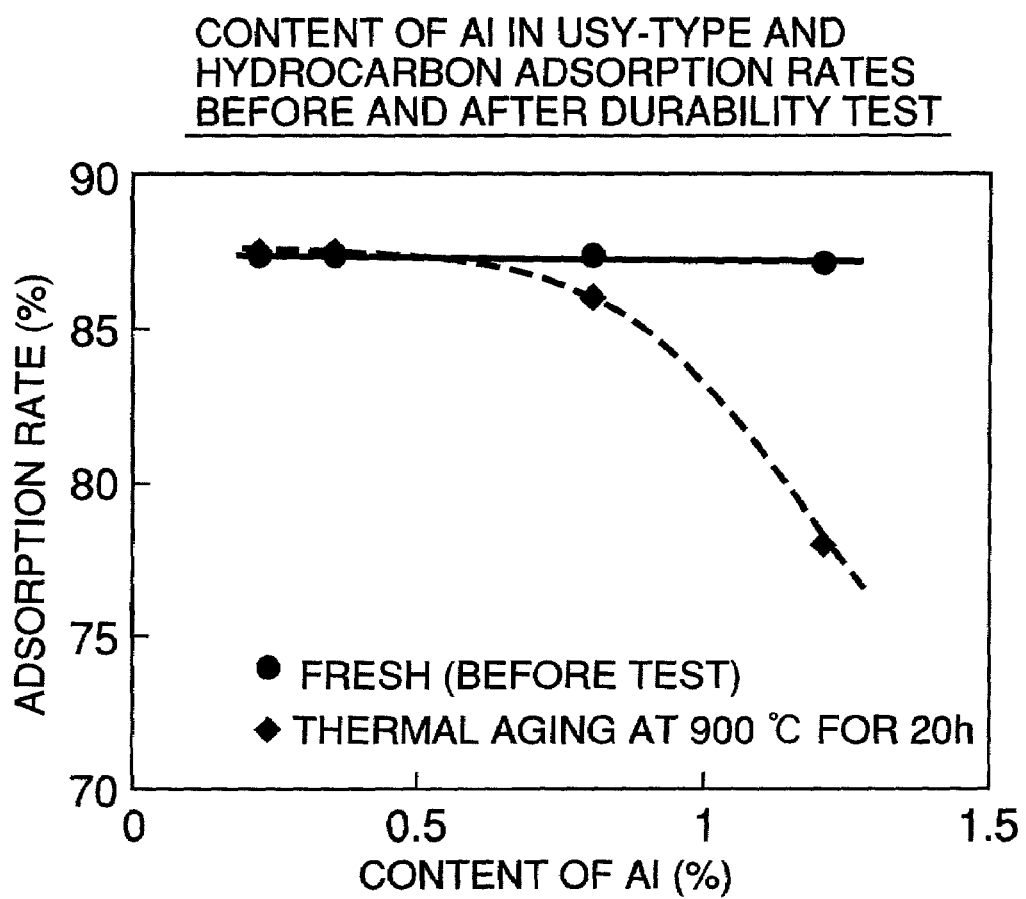
FIG. 11 is a graph and a table showing the relationship between the content of Al in USY and the HC-adsorption rate.

It can be seen from FIG. 10 that if the content of Al in the ferrierite-type zeolite is equal to or lower than 1% by weight (particularly preferably, equal to or lower than 0.5% by weight), the hydrophobic nature of the zeolite can be enhanced, whereby the sufficient HC-adsorbing ability of the zeolite can be ensured, and that if heat is applied to the ferrierite-type zeolite for a long time, the adsorption rate is reduced irrespective of the content of Al. It can be seen from FIG. 11 that if the content of Al in the faujasite-type zeolite is equal to or lower than 1% by weight (particularly preferably, equal to or lower than 0.5% by weight), the sufficient durability of the zeolite such as heat resistance and caulking resistance is ensured and hence, even if the faujasite-type zeolite is exposed to a high-temperature exhaust gas or soot produced upon incomplete combustion, the reduction in performance of the adsorbent can be inhibited effectively.

FIG. 12 is a graph showing one example of a transition in temperature of the adsorbent after the starting of an engine in an actual vehicle (having a displacement of 2300 cc and four cylinders). As apparent from this graph, when the engine is usually started at a starting temperature of about 25° C., the temperature of the adsorbent rises relatively quickly up to about 225° C. for a first predetermined period of time (250 seconds) supposing the actual traveling of the vehicle for an extremely short time after the starting of the engine, then rises relatively slowly after the lapse of such period, and rises up to about 250° C. at a time point of lapse of a second predetermined period of time (500 seconds) supposing the actual traveling of the vehicle for a short time after the starting of the engine. On the other hand, when the engine is started at a starting temperature of about 0° C. in an extremely cold season, the temperature of the adsorbent rises relatively quickly up to about 200° C. for the first predetermined period T1, then rises relatively slowly after the lapse of such period and rises up to about 225° C. at the time point of lapse of the second predetermined period T2. Such transition of the temperature of the adsorbent follows a substantially similar progress, even if there are somewhat differences in the displacement of the engine, the structure of the exhaust system, and the structure and size of the HC adsorbing system. Therefore, if the desorption temperature of the adsorbent is set at 225° C. or less, even when the vehicle is moved to travel for a short period time in a cold season or in a cold district, the adsorbed HC is desorbed quickly and sufficiently, and the reduction in adsorbing performance of the adsorbent at the next starting of the engine can be avoided effectively. Further, if the desorption temperature is set at 210° C. or less, even when the vehicle is moved to travel for a short period time in a cold season or in a cold district, the adsorbed HC is desorbed quickly, irrespective of the structure, size and the like of the HC adsorbing system, and the reduction in adsorbing performance of the adsorbent at the next starting of the engine can be avoided further effectively.

Although the embodiments of the present invention have been described in detail, it will be understood that the present invention is not limited to the above-described embodiments, and various modifications in design may be made without departing from the spirit and scope of the invention defined in the claims.

For example, the structure designed to return the HC desorbed from the HC adsorbent to the exhaust system has been described in the embodiment, but according to the present invention, the desorbed HC may be returned to a portion of the exhaust system upstream of the catalyst.

What is claimed is:

1. An HC adsorbent for an internal combustion engine, which is mounted in one of a pair of exhaust passages which are provided in parallel to each other in an exhaust pipe downstream of an exhaust emission control catalyst for purifying an exhaust gas of the internal combustion engine, and through which the exhaust gas is permitted to flow selectively by a switchover valve, wherein said adsorbent is formed of a mixture of a plurality of types of zeolites having pores of different small diameters, a zeolite having pores of a small diameter equal to or larger than 3.5 Å and smaller than 6 Å and no pore of a small diameter equal to or larger than 6 Å and smaller than 7 Å and a zeolite having pores of a small diameter equal to or larger than 7 Å and smaller than 10 Å and no pore of a small diameter equal to or larger than 6 Å and smaller than 7 Å being contained in a total amount equal to or higher than 80% by weight in the mixture, and a zeolite having pores of a small diameter equal to or larger than 6 Å and smaller than 7 Å being also contained in an amount not exceeding 20% by weight in the mixture, wherein a ferrierite-type zeolite and a pentasil-type zeolite are selected as the zeolite having the pores of the small diameter equal to or larger than 3.5 Å and smaller than 6 Å and no pore of the small diameter equal to or larger than 6 Å and smaller than 7 Å, and a faujasite-type zeolite is selected as the zeolite having the pores of the small diameter equal to or larger than 7 Å and smaller than 10 Å and no pore of the small diameter equal to or larger than 6 Å and smaller than 7 Å, and in a three-component composition diagram in which each of ratios is indicated by one point within an equilateral triangle having three apexes each indicating the case where the mixture includes only one of zeolite components, the weight ratio of the ferrierite-type, pentasil-type and faujasite-type zeolites is set to lie in a region surrounded by a line segment connecting a point of (0:0.2:0.8), a point of (0.08:0.12:0.8), a point of (0.4:0.08:0.52), a point of (0.67:0.1:0.23), a point of (0.67:0.23:0.1), a point of (0.4:0.51:0.09), a point of (0.09:0.81:0.1) and a point of (0:0.81:0.19) to one another.

2. An HC adsorbent for an internal combustion engine, which is mounted in one of a pair of exhaust passages which are provided in parallel to each other in an exhaust pipe downstream of an exhaust emission control catalyst for purifying an exhaust gas of the internal combustion engine, and through which the exhaust gas is permitted to flow selectively by a switchover valve, wherein said adsorbent is formed of a mixture of a plurality of types of zeolites having pores of different small diameters, a zeolite having pores of a small diameter equal to or larger than 3.5 Å and smaller than 6 Å and no pore of a small diameter equal to or larger than 6 Å and smaller than 7 Å and a zeolite having pores of a small diameter equal to or larger than 7 Å and smaller than 10 Å and no pore of a small diameter equal to or larger than 6 Å and smaller than 7 Å being contained in a total amount equal to or higher than 80% by weight in the mixture, and a zeolite having pores of a small diameter equal to or larger than 6 Å and smaller than 7 Å being also contained in an amount not exceeding 20% by weight in the mixture, wherein a ferrierite-type zeolite and a pentasil-type zeolite are selected as the zeolite having the pores of the small diameter equal to or larger than 3.5 Å and smaller than 6 Å and no pore of the small diameter equal to or larger than 6 Å and smaller than 7 Å, and a faujasite-type zeolite is selected as the zeolite having the pores of the small diameter equal to or larger than 7 Å and smaller than 10 Å and no pore of the small diameter equal to or larger than 6 Å and smaller than 7 Å, and in a three-component composition diagram in which each of ratios is indicated by one point within an equilateral triangle having three apexes each indicating the case where the mixture includes only one of zeolite components, the weight ratio of the ferrierite-type, pentasil-type and faujasite-type zeolites is set to lie in a region surrounded by a line segment connecting a point of (0.1:0.18:0.72), a point of (0.4:0.16:0.44), a point of (0.55:0.2:0.25), a point of (0.55:0.25:0.2), a point of (0.4:0.43:0.17), a point of (0.1:0.7:0.2), a point of (0.02:0.58:0.4) and a point of (0.03:0.4:0.57) to one another.

3. An HC adsorbent for an internal combustion engine according to either one of claim 1 and claim 2, wherein the content of Al in the faujasite-type zeolite is defined to be equal to or lower than 1% by weight.

4. An HC adsorbent for an internal combustion engine according to either one of claim 1 and claim 2, wherein at least a ferrierite-type zeolite is selected as the zeolite having the pores of the small diameter equal to or larger than 3.5 Å and smaller than 6 Å and no pore of the small diameter equal to or larger than 6 Å and smaller than 7 Å, the content of Al in the ferrierite-type zeolite being defined to be equal to or lower than 1% by weight.

5. An HC adsorbent for an internal combustion engine according to either one of claim 1 and claim 2, wherein the content of the zeolite having the pores of the small diameter equal to or larger than 6 Å and smaller than 7 Å in the mixture is defined to be lower than 3% by weight, and the desorption temperature for the adsorbed HCs is defined to be equal to or lower than 225° C.

6. An HC adsorbent for an internal combustion engine according to either one of claim 1 and claim 2, wherein the content of the zeolite having the pores of the small diameter equal to or larger than 6 Å and smaller than 7 Å in the mixture is defined to be lower than 1% by weight, and the desorption temperature for the adsorbed HCs is defined to be equal to or lower than 210° C.

* * * * *